HIGH-DENSITY MAGNETIC RECORDING SCHEME

Filed Aug. 26, 1968 2 Sheets-Sheet 1

INVENTORS
CHARLES H. TOLMAN
MAYNARD C. PAUL
PAUL E. OBERG

BY Kenneth T Grace
ATTORNEY

HIGH-DENSITY MAGNETIC RECORDING SCHEME

Filed Aug. 26, 1968 2 Sheets-Sheet 2

INVENTORS
CHARLES H. TOLMAN
MAYNARD C. PAUL
PAUL E. OBERG
BY Kenneth T. Grace
ATTORNEY 3,564,558

HIGH-DENSITY MAGNETIC RECORDING SCHEME

Charles H. Tolman, Bloomington, and Paul E. Oberg and Maynard C. Paul, Minneapolis, Minn., assignors to Sperry Rand Corporation, New York, N.Y., a corporation of Delaware Filed Aug. 26, 1968, Ser. No. 755,186
Int. Cl. G11b 5/16, 5/02, 5/30
U.S. Cl. 346—74 20 Claims

ABSTRACT OF THE DISCLOSURE

A method of high-density magnetic recording using a magnetic recording head having a recording gap that is inductively coupled to a relatively moving or stationary thin-ferromagnetic-film recording medium of a thickness that is insufficient to support Bloch walls, i.e., can only support Néel walls, between adjacent domains and having an easy axis that is orthogonal to the direction of relative movement or parallel to the recording gap. The recording medium's interdomain Néel walls are formed with the magnetization within the walls having the same directional rotational, i.e., winding, sense, e.g., clockwise or counterclockwise, by applying first or second and opposite polarity orthogonal fields $H_L$ and $H_T$ in the recording gap.

BACKGROUND OF THE INVENTION

Techniques for the storage of digital and analog information in a magnetizable medium are well-known in the electronic data processing arts. Such techniques may be considered to broadly include static and dynamic system; a static system would be as described in the S. M. Rubens, et al., Patent No. 3,030,612, while a dynamic system would be as described in the W. W. Davis, Patent No. 3,184,783. The present invention is directed toward either a static or a dynamic system in which a read/write magnetic recording head is inductively associated with a relatively stationary or moving magnetizable surface, such as a magnetic tape, disc or drum.

Prior art dynamic systems have been limited to maximum bit densities of 2,000 bits per inch. Such systems generally utilize a longitudinal recording system; i.e., a system in which the direction of magnetization polarization is parallel to the direction of relative movement of the recording surface. This bit density is largely determined by the design of the magnetic recording head with the magnetic characteristics of the recording medium and the interdomain Bloch wall stability being a limiting factor.

Proposed prior art dynamic systems include utilizing a transverse recording system; i.e., a system in which the direction of magnetization polarization is orthogonal to the direction of relative movement of the recording surface. Using a thin-ferromagnetic-film of 200 angstroms (A.) to 2,000 A. thickness as a storage medium has been proposed by D. O. Smith in his "Proposal For Magnetic Doman-Wall Storage And Logic" IRE Transactions on Electronic Computers, December 1961, pages 708–711. This system proposes the storage of binary information in the directional rotational, i.e., winding, sense of the interdomain Néel or Bloch wall magnetization vector, e.g., clockwise rotation representative of a "1" and counterclockwise rotation representative of a "0," rather than in the direction of magnetization vector polarization of the domains. J. M. Ballantyne in his "Demonstration Of Magnetic Domain-Wall Storage And Logic," Journal of Applied Physics, Supplement to volume 33, Number 3, March 1962, pages 1067, 1068, discusses using a thin-ferromagnetic-film of 50 A. to 300 A. in thickness, which thickness is insufficient to support Bloch walls between adjacent domains, to achieve binary information storage, as proposed by D. O. Smith, by Néel walls of a first or of a second and opposite sense of rotation of the magnetization vector within the wall. Both proposals utilize wires that are oriented at an angle to the longitudinal axis of the tape-like magnetizable medium to write the information into the storage medium and magneto-optical systems to read the information out of the storage medium—see the article "Magneto-Optical Readout Of Magnetic Recordings," T. Lentz, et al., Electronics, Sept. 1, 1961, pages 36–39.

SUMMARY OF THE INVENTION

The present invention is directed toward a read/write magnetic recording scheme for achieving high-density magnetic recording using a magnetic recording head having a recording gap that is inductively coupled to a relatively moving or stationary thin-ferromagnetic-film or recording medium. The recording medium is of a thickness insufficient to support Block walls, i.e., can only support Néel walls, between adjacent domains and has an easy axis that is orthogonal to the direction of relative movement, i.e., transverse recording. The recording medium's interdomain walls are formed with the magnetization within the walls having the same directional rotational, i.e., winding, sense, e.g., clockwise or counterclockwise, by applying orthogonal fields $H_L$ and $H_T$ in the recording gap. The $H_L$ field polarity, i.e., along the recording medium's easy axis, is of a first or a second and opposite polarity while the $H_T$ field polarity, i.e. transverse to the recording medium's easy axis, is of a corresponding first or a second and opposite polarity for causing the resultant field $H_R$ to rotate in the same winding sense during the generation of the interdomain walls. By utilizing interdomain Néel walls of the same winding sense the walls are substantially non-annihilating permitting high-density magnetic recording with magnetizable materials having small-field switching proporties and are precisely positioned in the recording medium by the leading edge of the trailing pole piece as determined by the timing of the polarity reversal of the concurrently applied $H_L$ and $H_T$ field generating current signals.

For optimum operation of the discussed embodiment the recording gap width should be in the order of the so-formed domains in the recording medium. With a recording head gap width of 10,000 A. in width and of 0.02 inch in length a magnetic tape having a thin-ferromagnetic-film recording medium of 50 A. to 300 A. in thickness can be made to record bit densities of 25,000 bits per inch along 48 parallel tracks, or channels, at a tape speed of 7½ inches per second and a maximum recording signal frequency of approximately 187,500 Hz.

DESCRIPTION OF THE PREFERRED EMBODIMENTS

Figure 1:
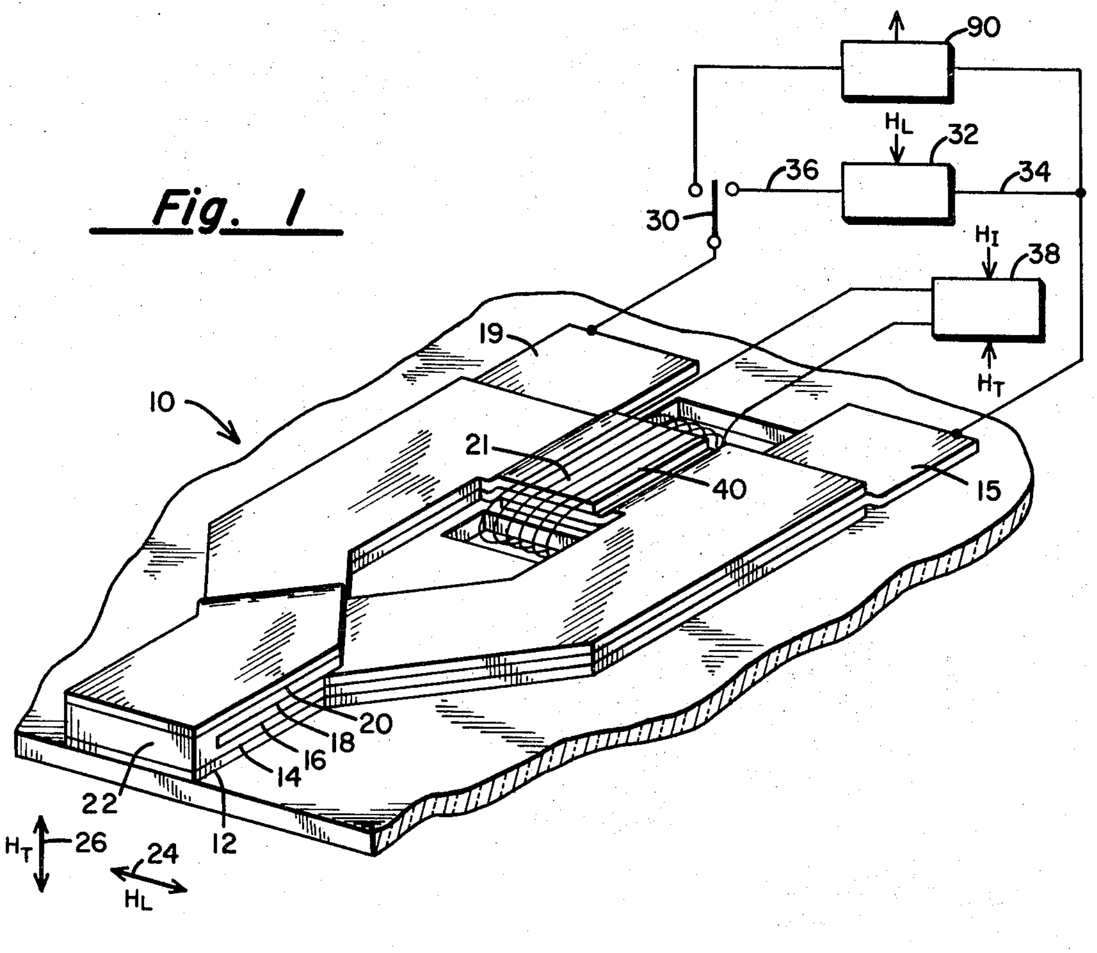
FIG. 1 is a perspective view of a magnetic recording head arrangement that may be utilized by the present invention.

With particular reference to FIG. 1 there is presented a perspective view of a magnetic recording head arrangement that may be utilized by the present invention. For optimum operation of the discussed embodiment, recording head 10 is preferably constructed in accordance with the copending patent application of M. C. Paul, et al., ERA-1751, Ser. No. 755,646 filed Aug. 27,1968 and assigned to the Sperry Rand Corporation as is the present invention. Recording head 10 essentially consists of the stacked, superposed arrangement of magnetizable layer 12, conductive layer 14, insulative layer 16, conductive layer 18, and magnetizable layer 20. Insulative layer 16, at its first end, is spaced away from the recording surface 22 in the area of which conductive layers 14, 18 merge to form a continuous electrical circuit that constitutes a stripline element. The recording head gap width, the distance between the opposing surfaces of magnetizable layers 12, 20 along the recording surface 22, is thus determined by the thicknesses of layers 14, 18. As, in this embodiment, conductive layers 14, 18 are in intimate contact with magnetizable layers 12, 20, respectively, it is essential that the magnetizable layers, 12, 20, at their superposed, overlapping portion 21 farthest from the recording surface 22, be insulated from each other so as to preclude a direct electrical short between the two terminals 15, 19 of conductive layers 14, 18, respectively.

Conductive layers 14, 18, in the area of the recording surface 22, function as a stripline providing a magnetic field $H_L$ in the direction 24 when a suitable current signal from $H_L$ source 32 is coupled across terminals 15, 19 by means of conductors 34, 36, respectively, and switch 30. Additionally, magnetizable layers 12, 20 provide a magnetic field $H_T$ along line 26, in the area of recording surface 22, when $H_T$ source 38 inductively couples an appropriate field by a winding 40 which is inductively coupled to magnetizable layers 12, 20 in their superposed, overlapping portion 21.

For a meaningful discussion of the present invention the following approximate characteristics of the system to be discussed are presented; it being understood that no limitation thereto is intended.

Recording Head Gap:
- Width—10,000 A.
- Length—0.02 inch

Recording Medium:
- Width—1.00 inch tape
- Material—81% Ni-19% Fe
- Thickness—100 A.
- $H_c$—1 oersted (oe.)
- $H_k$—.15 oersted
- Speed—7½ inches per second Recording Signal Frequency:
- 187,500 Hz.

Recording Head to Tape Spacing
- 0.002 inch

Figure 2A:
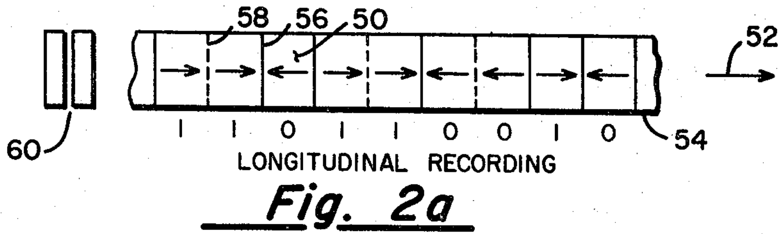
FIGS. 2*a*, 2*b* are illustrations of domain magnetization polarizations for longitudinal and transverse recording systems, respectively.
Figure 2B:
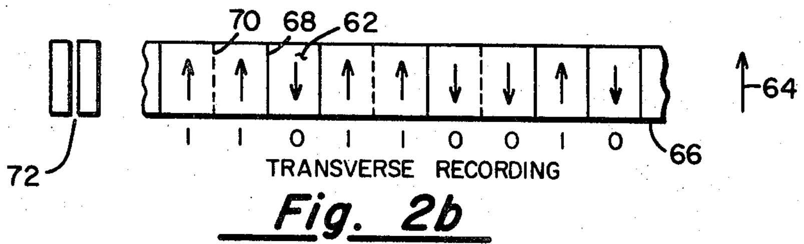

With particular reference to FIGS. 2*a*, 2*b* there are presented illustrations of domain magnetization polarizations for longitudinal and transverse recording systems, respectively. In the longitudinal recording system of FIG. 2*a* the domains 50 are formed with their magnetization polarization parallel to and oriented in a first or a second and opposite direction along the easy axis 52 of magnetic tape 54. Interdomain walls 56, between domains of opposite magnetization polarization, are oriented generally orthogonal to the easy axis 52 which orthogonal relationship tends to create interdomain walls of inherently relatively high instability. Interdomain walls 58 between domains of like magnetization polarization do not exist wherein contiguous domains of like magnetization polarization form one large domain. The recording gap 60 is oriented orthogonal to the easy axis 52 of the magnetic tape 54 with the interdomain walls 56 established substantially parallel to the trailing edge of the recording gap 60.

In the transverse recording system of FIG. 2*b* the domains 62 have their magnetization polarization oriented in a first or a second and opposite direction along the easy axis 64 of magnetic tape 66. Interdomain walls 68, between domains of opposite magnetization polarization, are, consequently, oriented substantially parallel to the easy axis 64 establishing walls of inherently relatively high stability. As in the longitudinal recording system of FIG. 2*a*, interdomain walls 70 between domains of like magnetization polarization do not exist with contiguous domains of like magnetization polarization constituting one large domain. The recording gap 72 is oriented parallel to the easy axis 64 of magnetic tape 66 whereby the overall system arrangement permits the recording gap 72 trailing edge to establish sharply defined interdomain walls 68 of high inherent stability.

Figure 3:
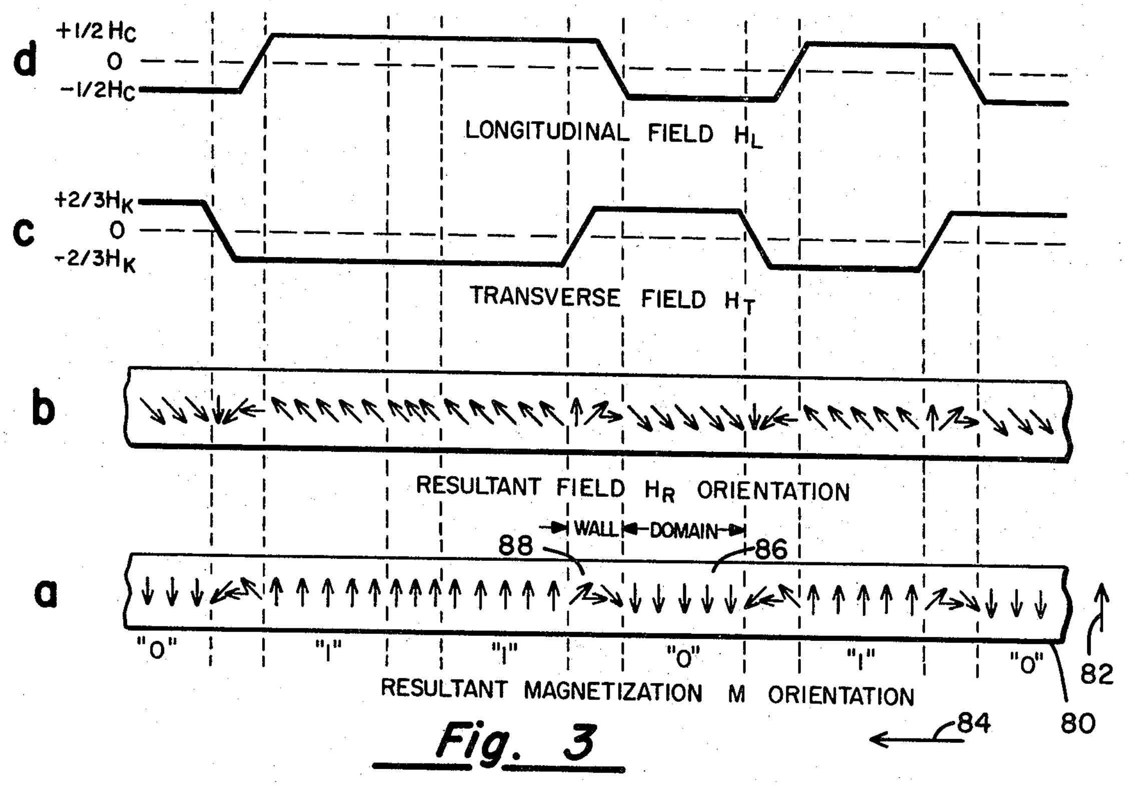
FIGS. 3*a*, 3*b*, 3*c*, 3*d* are illustrations of the resultant magnetization M orientation in the recording medium, the resultant field $H_R$ orientation in the recording gap, the transverse field $H_T$ waveform and the longitudinal field $H_L$ waveform, respectively, presented for a discussion of the present invention.

With particular reference to FIG. 3 there is presented an illustration of the resultant magnetization M orientation in the plane of the recording medium, the resultant field $H_R$ orientation in the recording gap and the plane of the recording medium, the transverse field $H_T$ waveform, and the longitudinal field $H_L$ waveform, respectively, that will be utilized for discussion of a preferred utilization of the present invention. FIG. 3*a* depicts a magnetic tape 80 having an easy axis 82 and moving in the direction of arrow 84. Magnetic tape 80 may be considered to be of one track width having a plurality of domains 86 wherein the domains 86 of opposite magnetization polarization are separated by an interdomain Néel wall 88. As stated hereinabove, an essential element of the present invention involves establishing the magnetization within the interdomain Néel walls into the same winding sense. The convention illustrated is that of a uniform clockwise winding sense of the magnetization within the interdomain Néel walls to establish the magnetization polarization in contiguous domains of opposite polarization along the easy axis 82.

The resultant field $H_R$ orientation of FIG. 3*b* for establishing the corresponding resultant magnetization M orientation of FIG. 3*a* into magnetic tape 80 is established by the concurrently applied transverse field $H_T$ and longitudinal field $H_L$ of FIGS. 3*c*, 3*d*, respectively. In the discussed embodiment of the present invention the transverse field $H_T$ and longitudinal field $H_L$ intensities are selected to be approximately $\pm 2/3$ $H_k$ (anisotropy field) and approximately $\pm 1/2$ $H_c$ (coercive force), respectively, no limitation thereto intended. Such relative field intensities may be of many various combinations the useful combinations dictated by the rotational switching threshold of the S. M. Rubens, et al., Pat. No. 3,030,612 which defines the switching characteristics of the thin-ferromagnetic-film layer of 100 A. in thickness and of 81% Ni-19% Fe that constitutes the recording medium on magnetic tape 80.

With pulse sources 38, 32 concurrently providing transverse field $H_T$ of FIG. 3*c* and longitudinal $H_L$ of FIG. 3*d* respectively, in the recording gap along recording surface 22 there is provided a corresponding resultant field $H_R$ orientation of FIG. 3*b* within the recording gap which, in turn, establishes the corresponding resultant magnetization M orientation in the plane of magnetic tape 80. The orthogonally oriented longitudinal $H_L$ and transverse field $H_T$, and their time varying relationship, generates the clockwise resultant field $H_R$ orientation within the recording gap. The so-generated resultant field $H_R$ is, as illustrated in FIG. 3*b*, of a substantially constant vector orientation within the spatially varying distance along the magnetic tape 80 over the domain 86 length, changing only during the generation of the interdomain Néel wall 88. This vector orientation change is caused by the time-varying polarity variation of the concurrently applied longitudinal and transverse fields $H_L$ and $H_T$. Otherwise, as illustrated in FIGS. 3*c*, 3*d* the so-applied longitudinal and transverse fields $H_L$, $H_T$ are of a substantially constant intensity of first or second and opposite polarities. As illustrated in FIGS. 3*c*, 3*d* the polarity change of the transverse field $H_T$ precedes the polarity change of the longitudinal field $H_L$ with the transverse field $H_T$ polarity reversal being completed before that of the longitudinal field $H_L$ polarity reversal. This polarity reversal, time-varying relationship of the transverse field $H_T$ and longitudinal field $H_L$ forces the resultant field $H_R$ to always have the same directional rotational, i.e., winding, sense in a clockwise direction. The resultant field $H_R$ orientation is, by the effect of the easy axis 82, caused to rotate the magnetization M on magnetic tape 80 into a corresponding clockwise resultant magnetization M orientation as illustrated in FIG. 3*a*. The present invention permits a static or dynamic readout of the information stored in the magnetic tape 80 of FIG. 3 by pulse source 38 generating an interrogation field $H_I$ that is essentially a transverse field $H_T$ of approximately $\pm\frac{2}{3}$ $H_k$ but of an interrogation frequency of approximately 10 mHz. For the read operation, source 32, across terminals 15, 19 of recording head 10—see FIG. 1—may be replaced by a sense amplifier 90 by switch 30. The application of the interrogation field $H_I$ causes the resultant magnetization M in the domains 86 of FIG. 3*a* to oscillate about easy axis 82, the easy axis component of which induces a corresponding voltage in the stripline portion of recording face 22 within the recording gap.

Figure 4:
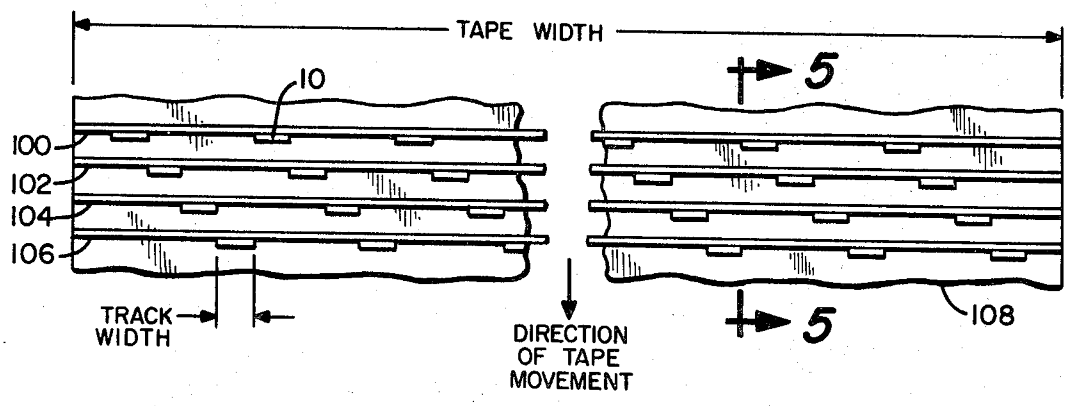
FIG. 4 is an illustration of a typical recording head, magnetic tape arrangement for utilizing the present invention.
Figure 5:
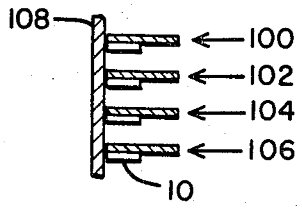
FIG. 5 is a sectional view of the arrangement of FIG. 4 taken along line 5—5 of FIG. 4.

With particular reference to FIG. 4 there is presented an illustration of a typical recording head, magnetic tape arrangement utilizing the present invention. In this arrangement a plurality, i.e., 4, of recording head assemblies 100, 102, 104, 106, each having a plurality, i.e., 12, of recording heads 10 supported thereby are arranged in a stacked alignment orthogonal to the longitudinal axis of the magnetic tape 108 and, correspondingly, parallel to the easy axis thereof. With each recording head 10 having a recording head length of 0.02 inch in length, each recording head assembly 100, 102, 104, 106, is, accordingly, staggered 0.02 inch providing a total of 48 tracks, or channels, across the 1.00 inch width of magnetic tape 108. This arrangement will provide a bit density of approximately 1,200,000 bits per square inch. With particular reference to FIG. 5 there is presented a sectional view of the arrangement of FIG. 4 taken along line 5—5 of FIG. 4. This sectional view is presented to merely provide a better orientation of the recording head assemblies 100, 102, 104, 106 with respect to the magnetic tape 108.

Thus, it is apparent that there has been described and illustrated herein preferred embodiments of the present invention that provide a novel method of high density magnetic recording using a magnetic recording head having a recording gap that is inductively coupled to a relatively-moving thin-ferromagnetic-film of a thickness sufficiently only to support Néel walls between contiguous domains of opposing magnetization polarizations.

Having, now fully illustrated and described our invention, what we claim to be new and desire to protect by Letters Patent is set forth in the appended claims.

We claim:

1. A method of high-density magnetic recording using a magnetic recording head having a gap that is inductively coupled to a relatively-moving thin-feromagnetic film of a thickness insufficient to support Bloch walls between adjacent domains and having an easy axis that is orthogonal to the direction of relative movement, the method comprising:

locating the gap of a magnetic recording head in an inductive relationship with a relatively-moving thin-ferromagnetic-film of a thickness insufficient to support Bloch walls but does support Néel walls between adjacent domains and in a parallel relationship with the film's easy axis and orthogonal to the film's direction of relative movement;

generating across the recording gap a transverse field that is of a first or of a second and opposite polarity;

generating along the recording gap a longitudinal field that is of a first or of a second and opposite polarity for setting the magnetization of a domain in said film into a first or a second and opposite direction along said film's easy axis;

concurrently inductively coupling said transverse and longitudinal fields to said film for generating a rotating resultant field in the recording gap that always rotates in the same direction in the plane of said film;

said resultant field inductively coupled to said film for establishing the interdomain Néel walls, which are parallel to the film's easy axis and which separate domains in the film that are set in said first or second and opposite direction along the film's easy axis by the change in polarity of said longitudinal field, in a uniformly rotating direction in the plane of said film.

2. The method of claim 1 wherein the polarity change of said longitudinal field precedes that of said transverse field.

3. The method of claim 1 wherein the polarity change of said transverse field precedes that of said longitudinal field.

4. The method of claim 3 wherein the polarity changes of said transverse and longitudinal fields spatially-overlap in said interdomain Néel walls.

5. The method of claim 4 wherein said transverse and longitudinal fields are of substantially constant intensities spatially over said domains.

6. The method of claim 5 wherein the transverse field intensity is approximately $\pm\frac{2}{3}$ $H_k$ of the film.

7. The method of claim 6 wherein the longitudinal field intenstiy is approximately $\pm\frac{1}{2}$ $H_c$ of the film.

8. A method of high-density recording, comprising:

forming a magnetic layer of a thickness insufficient to support Bloch walls but does support Néel walls between adjacent domains and having an easy axis in a given direction;

locating the recording gap of a recording head in an inductive relationship with said layer;

moving said layer past said recording gap with said easy axis parallel to said recording gap;

generating along the recording gap and in said layer a bipolar first field that is skewed with respect to said layer's easy axis and that is of a first or of a second and opposite polarity for setting the magnetization of a domain in said layer into a first or a second and opposite direction along said layer's easy axis;

generating along the recording gap and in said layer during the polarity change of said first field a rotating second field;

rotating said second field always in the same direction in said layer;

establishing interdomain Néel walls, which are parallel to said layer's easy axis and which separate domains in said layer of said first or second and opposite direction along said layer's easy axis by the change of polarity of said first field, in a uniformly rotating direction in the plane of said layer.

9. The method of claim 8 wherein the polarity change of said transverse field precedes that of said longitudinal field.

10. The method of claim 8 wherein the polarity changes of said transverse and longitudinal fields spatially-overlap in said interdomain walls.

11. A method of high-density magnetic recording using a magnetic recording head having a recording gap that is inductively coupled to a thin-ferromagnetic-film of a thickness insufficient to support Bloch walls between adjacent domains and having an easy axis that is parallel to the recording gap, the method comprising:

moving in inductive relationship with and past the recording gap of a magnetic recording head a thin-ferromagnetic-film that is of a thickness insufficient to support Bloch walls but does support Néel walls between adjacent domains of opposite magnetization direction and that has an easy axis that is parallel to said recording gap and that is orthogonal to said direction of relative movement;

generating across the recording gap and in the plane of said film a field that is transverse said film's easy axis and that is of a first or of a second and opposite polarity; and concurrently, generating along said recording gap and in the plane of said film a field that is longitudinal said film's easy axis and that is of a first or of a second and opposite polarity which polarity is representative of setting the magnetization of a domain in said film in a first or a second and opposite direction along said film's easy axis;

generating, by the polarity reversal of said transverse and longitudinal fields, a high-density rotating resultant field that rotates in the same magentic sense in the plane of said film irrespective of the polarity of said longitudinal field;

reversing the polarities of said transverse and longitudinal fields in the area of a to-be-formed interdomain Néel wall in said film;

rotating the magnetization between domains in said film of opposite magnetization direction in the same magnetic sense in the plane of said film;

establishing interdomain Néel walls between domains of opposite magnetization direction in said film by said rotating magnetization.

12. The method of claim 11 wherein the polarity change of said longitudinal field precedes that of said transverse field.

13. The method of claim 11 further including the method of reading out the informational content of said thin-ferromagnetic-film, the method comprising:

generating across the recording gap and in said film an interrogation field that is transverse said film's easy axis and that is of a relatively high interrogation frequency for causing the resultant magnetization M in the domains of said film to oscillate about said film's easy axis for generating an easy axis component;

generating, by said easy axis component, in a stripline portion of the recording gap a voltage corresponding to said informational content.

14. The method of claim 13 wherein the interrogation field intensity is approximately $\pm 2/3\ H_k$ and of a frequency of approximately 10 mHz.

15. The method of claim 11 wherein said transverse and longitudinal fields are of substantially constant intensities spatially over said domains.

16. The method of claim 15 wherein the transverse field intensity is approximately $\pm 2/3\ H_k$ of said film.

17. The method of claim 16 wherein the longitudinal field intensity is approximately $\pm 1/2\ H_c$ of said film.

18. A method of high-density magnetic recording using a magnetic recording head having a recording gap that is inductively coupled to a relatively-moving thin-ferromagnetic-film of a thickness insufficient to support Bloch walls between adjacent domains and having an easy axis that is parallel to the recording gap, the method comprising:

moving the film past the recording gap with the film's easy axis being parallel to the recording gap;

generating a first magnetic field of a first or of a second and opposite polarity along the recording gap and in the plane of the film for storing information in the film in a plurality of domains of a first or of a second and opposite polarity along the film's easy axis;

generating a rotating second magnetic field along the recording gap and in the plane of the film between said plurality of domains of opposite polarity;

establishing interdomain Néel walls between said domains of opposite polarity with said second magnetic field;

rotating the magnetization in said interdomain Néel walls in the same magnetic sense in the plane of the film irrespective of the polartiy of the magnetization in adjacent domains that are separated by the interdomain Néel walls.

19. The method of claim 18 in which said rotating second magnetic field is caused to rotate in the same magnetic sense in the plane of the film irrespective of the polarity of the magnetization in adjacent domains that are separated by said interdomain Néel walls by:

coupling first and second current signals, each of first and second and opposite polarities, to said magnetic recording head for generating transverse and longitudinal fields, respectively, in said recording gap; and controlling the polarity reversal of said transverse field to precede the polarity reversal of said longitudinal field.

20. The method of claim 19 further including:

controlling the relative polarities of said transverse and longitudinal fields for rotating said second magnetic field in the same clockwise or counterclockwise direction in the plane of said film.

References Cited

UNITED STATES PATENTS

| | | | |
|---|---|---|---|
| 3,092,815 | 6/1963 | Hinze | 346—74X |
| 3,271,751 | 9/1966 | Proebster | 346—74X |
| 3,320,597 | 5/1967 | Hart | 340—174 |
| 3,456,250 | 7/1969 | Barcaro et al. | 340—174.1 |
| 3,487,388 | 12/1969 | Camp | 340—174.1 |

BERNARD KONICK, Primary Examiner

G. M. HOFFMAN, Assistant Examiner

U.S. Cl. X.R.

179—100.2; 340—174.1